United States Patent
Lim et al.

(10) Patent No.: US 10,476,954 B2
(45) Date of Patent: Nov. 12, 2019

(54) COMMUNICATION DEVICE, COMMUNICATION METHOD, AND COMMUNICATION SYSTEM

(71) Applicant: SAMSUNG ELECTRONICS CO., LTD., Suwon-si (KR)

(72) Inventors: Kyeong-chae Lim, Suwon-si (KR); Ki-hun Kim, Suwon-si (KR); Jae-sung An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/198,431

(22) Filed: Jun. 30, 2016

(65) Prior Publication Data

US 2017/0013055 A1    Jan. 12, 2017

(30) Foreign Application Priority Data

Jul. 7, 2015    (KR) .......................... 10-2015-0096784

(51) Int. Cl.
*H04L 1/00*        (2006.01)
*H04L 29/08*       (2006.01)
(Continued)

(52) U.S. Cl.
CPC .......... *H04L 67/1068* (2013.01); *H04W 8/186* (2013.01); *H04W 80/04* (2013.01); *H04W 84/12* (2013.01); *H04W 84/20* (2013.01)

(58) Field of Classification Search
CPC ..... H04W 8/186; H04W 84/20; H04W 84/12; H04W 80/04; H04W 92/18; H04W 88/02; H04L 67/1068
See application file for complete search history.

(56) References Cited

U.S. PATENT DOCUMENTS

2011/0268020 A1*  11/2011  Singamneni ...... H04W 56/0015
                                                     370/328
2012/0106375 A1*  5/2012   Woo .................... H04W 84/20
                                                     370/252
(Continued)

FOREIGN PATENT DOCUMENTS

EP      2 565 718 A1      3/2013
WO      2014025218 A1     2/2014
WO      2014/125824 A1    8/2014

OTHER PUBLICATIONS

International Search Report and Written Opinion dated Sep. 7, 2016 issued by the International Searching Authority in counterpart International Application No. PCT/KR2016/006450. (PCT/ISA/210, PCT/ISA/220, and PCT/ISA/237).

(Continued)

*Primary Examiner* — Abdelillah Elmejjarmi
(74) *Attorney, Agent, or Firm* — Sughrue Mion, PLLC

(57) ABSTRACT

Disclosed are a communication device, a communication method, and a communication system. The communication system includes a communication device configured to determine a device to function as a group owner (GO) device from the communication device and a counterpart communication device communicating with the communication device and transmit information indicating which one of the communication device and the counterpart communication device is the GO device to the counterpart communication device, and the counterpart communication device configured to receive the information indicating which one of the communication device and the counterpart communication device is the GO device from the communication device and transmit, in response to receiving the information, a signal for agreeing to the information indicating which one of the communication device and the counterpart communication device is the GO device to the communication device.

12 Claims, 14 Drawing Sheets

(51) Int. Cl.
*H04W 80/04* (2009.01)
*H04W 8/18* (2009.01)
*H04W 84/12* (2009.01)
*H04W 84/20* (2009.01)

(56) References Cited

U.S. PATENT DOCUMENTS

| | | |
|---|---|---|
| 2012/0134349 A1 | 5/2012 | Jung et al. |
| 2012/0224569 A1* | 9/2012 | Kubota ................ H04W 84/20 370/338 |
| 2013/0028156 A1 | 1/2013 | Vedantham et al. |
| 2013/0040576 A1 | 2/2013 | Yoon |
| 2013/0170482 A1 | 7/2013 | Jung |
| 2014/0078928 A1 | 3/2014 | Verma et al. |
| 2014/0269646 A1* | 9/2014 | Ramasamy ........... H04W 76/14 370/338 |
| 2015/0223046 A1 | 8/2015 | Patil et al. |

OTHER PUBLICATIONS

Communication dated Feb. 6, 2018, issued by the European Patent Office in counterpart European application No. 16821552.3.

* cited by examiner

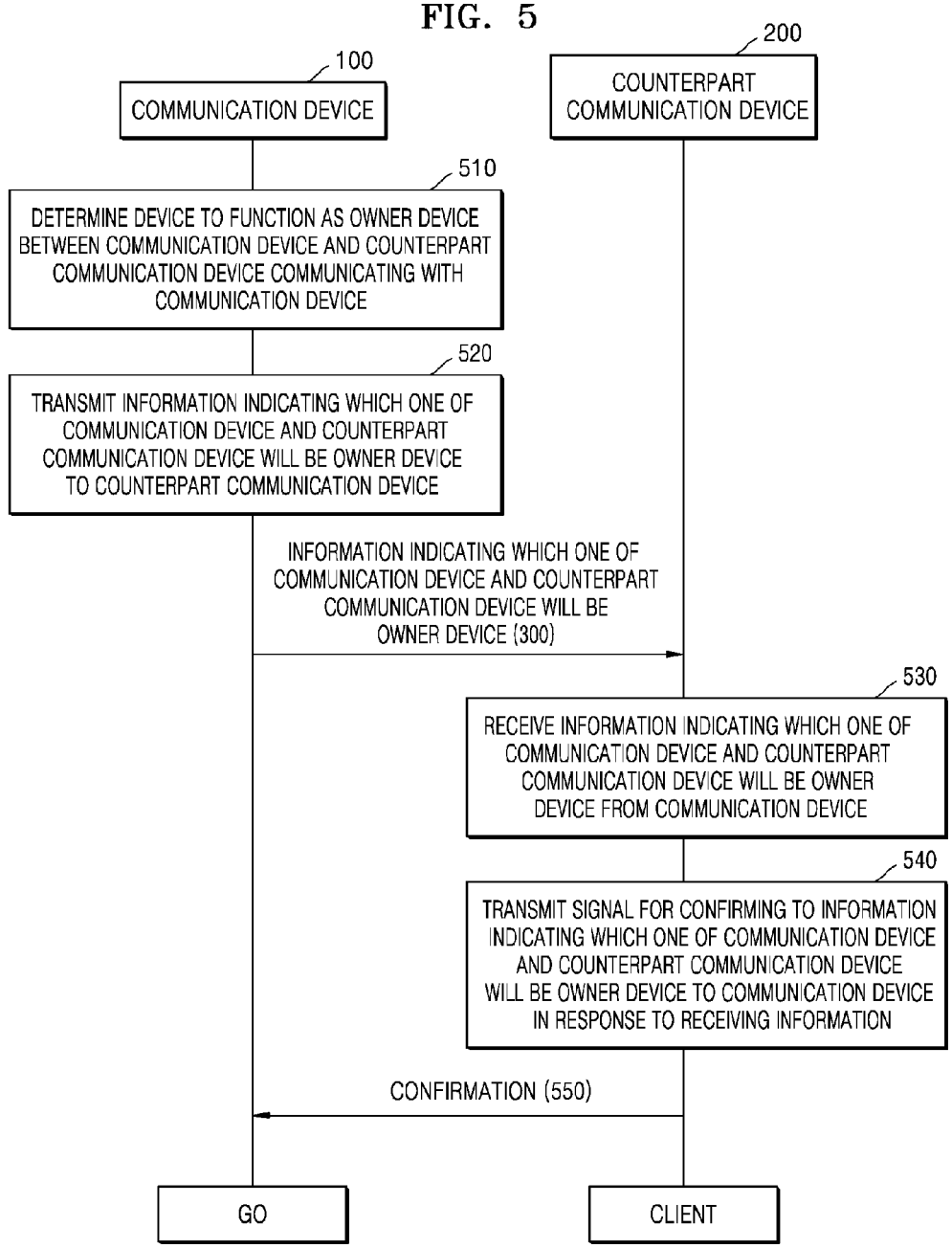

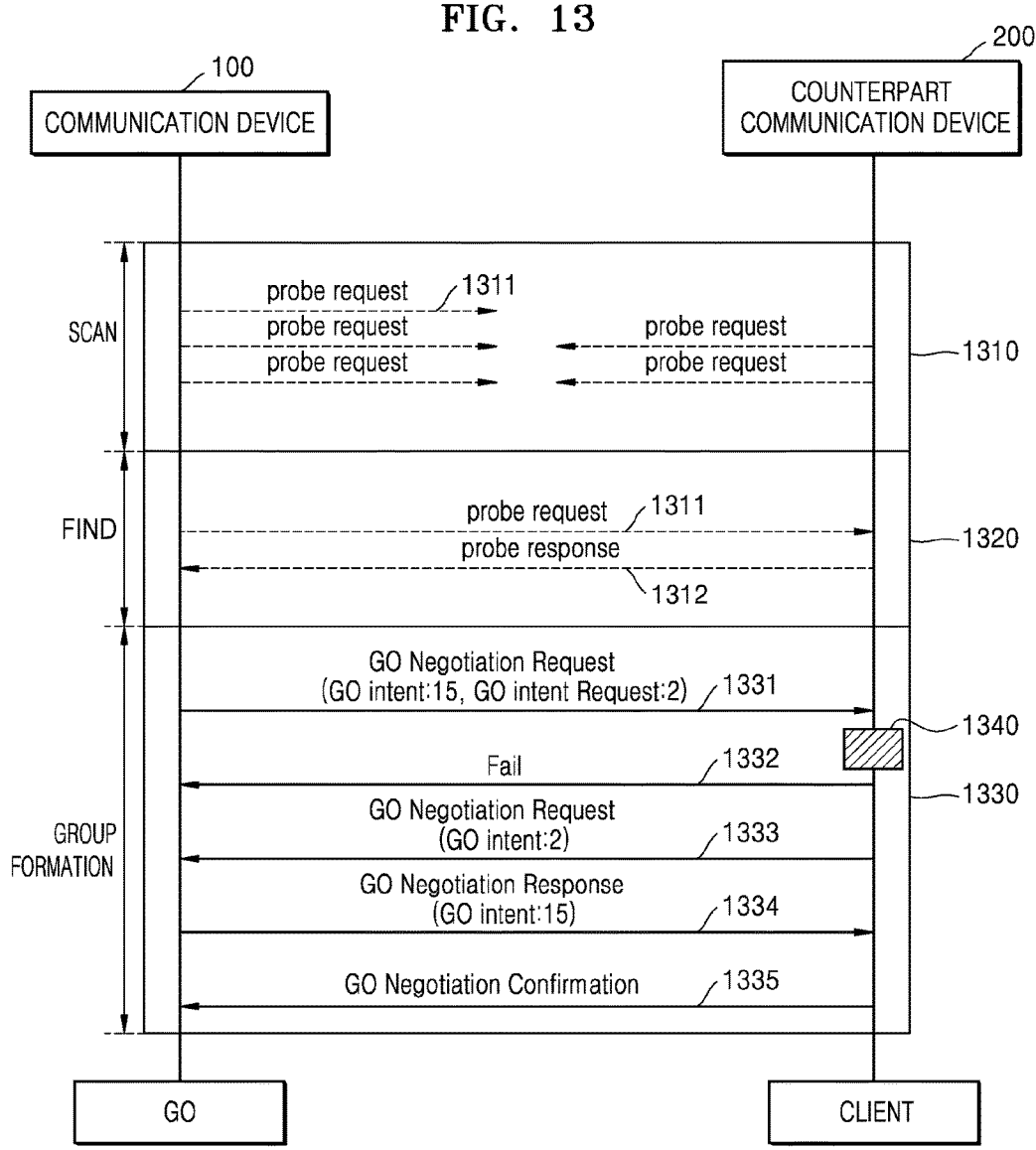

COMMUNICATION DEVICE, COMMUNICATION METHOD, AND COMMUNICATION SYSTEM

CROSS-REFERENCE TO RELATED APPLICATION

This application claims the benefit of Korean Patent Application No. 10-2015-0096784, filed on Jul. 7, 2015, in the Korean Intellectual Property Office, the disclosure of which is incorporated herein in its entirety by reference.

BACKGROUND

1. Field

Apparatuses and methods consistent with exemplary embodiments relate to a communication device, a communication method, and a communication system, and more particularly, to a communication device, a communication method, and a communication system for establishing a peer-to-peer (P2P) connection.

2. Description of the Related Art

Wireless fidelity (Wi-Fi) is a trademark of Wi-Fi alliance, and denotes a series of techniques which support an Institute of Electrical and Electronics Engineers (IEEE) 802.11-based wireless local area network (WLAN) connection, a connection between devices (Wi-Fi P2P), a personal area network (PAN)/LAN/wide area network (WAN) configuration, and so on. Basically, Wi-Fi communication is communication between an access point (AP) which functions to transfer data to the Internet and a terminal, such as a laptop computer or a smart phone, through which a user is provided with a service. To use Wi-Fi, hardware (e.g., a WLAN card) for connecting to a terminal is necessary, and a device driver is required to be installed for an operating system (OS) to recognize the WLAN card. Since the hardware and the device driver are installed by default in portable terminals, such as a smart phone, a laptop computer, etc., users may use Wi-Fi without a particular setting, and a desktop user also may easily install and use the hardware and the device driver. Because Internet or mutual communication is possible without wiring, various devices, such as a game machine, a printer, a TV, etc., support Wi-Fi in recent years, and there is a recent trend toward increasing the number of terminals which support Wi-Fi.

Wi-Fi direct is direct communication between devices having a Wi-Fi function without passing through a Wi-Fi direct AP, which supports a connection between Wi-Fi devices. In Wi-Fi direct, devices mutually determine equipment which will operate as an AP when establishing an initial connection.

SUMMARY

One or more exemplary embodiments provide a communication device, a communication method, and a communication system for stably determining a group owner (GO) device in peer-to-peer (P2P) communication.

Additional aspects will be set forth in part in the description which follows and, in part, will be apparent from the description, or may be learned by practice of the exemplary embodiments.

According to an aspect of an exemplary embodiment, there is provided a communication device, the device including: a communication interface, and a controller configured to determine a device to function as a group owner (GO) device from the communication device and a counterpart communication device communicating with the communication device, and control the communication interface to transmit information indicating which one of the communication device and the counterpart communication device is the GO device to the counterpart communication device.

The information indicating which one of the communication device and the counterpart communication device is the GO device may include a GO intent value of the communication device and a GO intent value of the counterpart communication device set by the communication device.

The communication interface may transmit the information using at least one of a wireless fidelity (Wi-Fi) GO negotiation request frame and a Wi-Fi provision discovery request frame.

According to an aspect of another exemplary embodiment, there is provided a communication device, the device including: a communication interface configured to receive information indicating which one of the communication device and a counterpart communication device is a group owner (GO) device from the counterpart communication device, and a controller configured to control the communication interface to transmit a signal for confirming the information indicating which one of the communication device and the counterpart communication device is the GO device to the counterpart communication device in response to the information.

The information indicating which one of the communication device and the counterpart communication device is be the GO device may include a GO intent value of the counterpart communication device and a GO intent value of the communication device set by the counterpart communication device.

The information may be received using at least one of a Wi-Fi GO negotiation request frame and a Wi-Fi provision discovery request frame.

The signal for confirming the information may include the GO intent value of the communication device set by the counterpart communication device.

The communication interface may transmit the GO intent value of the communication device set by the counterpart communication device using a Wi-Fi GO negotiation response frame.

According to an aspect of another exemplary embodiment, there is provided a communication method of a communication device, the method including: determining a device to function as a GO device from the communication device and a counterpart communication device communicating with the communication device, and transmitting information indicating which one of the communication device and the counterpart communication device is the GO device to the counterpart communication device.

The information indicating which one of the communication device and the counterpart communication device is the GO device may include a GO intent value of the communication device and a GO intent value of the counterpart communication device set by the communication device.

The information may be transmitted using at least one of a wireless fidelity (Wi-Fi) GO negotiation request frame and a Wi-Fi provision discovery request frame.

According to an aspect of another exemplary embodiment, there is provided a communication method of a communication device, the method including: receiving information indicating which one of the communication device and a counterpart communication device communicating with the communication device is a group owner (GO) device from the counterpart communication device, and transmitting a signal for confirming the information indicating which one of the communication device and the counterpart communication device is the GO device to the counterpart communication device in response to the information.

The information indicating which one of the communication device and the counterpart communication device is the GO device may include a GO intent value of the counterpart communication device and a GO intent value of the communication device set by the counterpart communication device.

The information may be received using at least one of a wireless fidelity (Wi-Fi) GO negotiation request frame and a Wi-Fi provision discovery request frame.

The signal for confirming the information may include the GO intent value of the communication device set by the counterpart communication device.

The signal for confirming the information which includes the GO intent value of the communication device set by the counterpart communication device may be transmitted using a wireless fidelity (Wi-Fi) GO negotiation response frame.

According to an aspect of another exemplary embodiment, there is provided a communication system includes: a communication device configured to determine a device to function as a group owner (GO) device from the communication device and a counterpart communication device communicating with the communication device, and transmit information indicating which one of the communication device and the counterpart communication device is the GO device to the counterpart communication device; and the counterpart communication device configured to receive the information indicating which one of the communication device and the counterpart communication device is the GO device from the communication device, and transmit a signal for confirming the information indicating which one of the communication device and the counterpart communication device is the GO device to the communication device in response to the information.

The information indicating which one of the communication device and the counterpart communication device is the GO device may include a GO intent value of the communication device and a GO intent value of the counterpart communication device set by the communication device.

The communication device may transmit the information using at least one of a wireless fidelity (Wi-Fi) GO negotiation request frame and a Wi-Fi provision discovery request frame.

The counterpart communication device may transmit the signal for confirming the information using a wireless fidelity (Wi-Fi) GO negotiation response frame including an intent value of the counterpart communication device set by the communication device.

According to an aspect of another exemplary embodiment, there is provided a communication method of a communication device and a counterpart communication device communicating with the communication device, the method including: performing a scan operation, by the communication device and the counterpart communication device, to transmit probe request frames to each other; performing a find operation, by the counterpart communication device, in response to the probe request frame transmitted from the communication device, to transmit a probe response frame to the communication device to detect each other; and performing a group formation operation to determine a device to function as a group owner (GO) device from the communication device and the counterpart communication device.

The performing the group formation operation may include transmitting, by the communication device, a GO negotiation request frame which includes information indicating which one of the communication device and the counterpart communication device is the owner device.

The information indicating which one of the communication device and the counterpart communication device is the owner device may include a GO intent value of the communication device and a GO intent value of the counterpart communication device set by the communication device.

The performing the group formation operation may include transmitting, by the counterpart communication device, a GO negotiation response frame which includes the GO intent value of the counterpart communication device transmitted by the communication device as a signal for agreeing to the information to the communication device.

The performing the group formation operation may further include transmitting, by the counterpart communication device, a state code indicating an intent to continue group formation to the communication device.

BRIEF DESCRIPTION OF THE DRAWINGS

These and/or other aspects will become apparent and more readily appreciated from the following description of the exemplary embodiments, taken in conjunction with the accompanying drawings, in which:

FIG. 5 is a sequence diagram of a communication process between a communication device and a counterpart communication device according to an exemplary embodiment;

FIG. 13 is a signal sequence diagram showing a communication process for determining an owner device between a communication device and a counterpart communication device according to an exemplary embodiment.

DETAILED DESCRIPTION OF EXEMPLARY EMBODIMENTS

Figure 1:
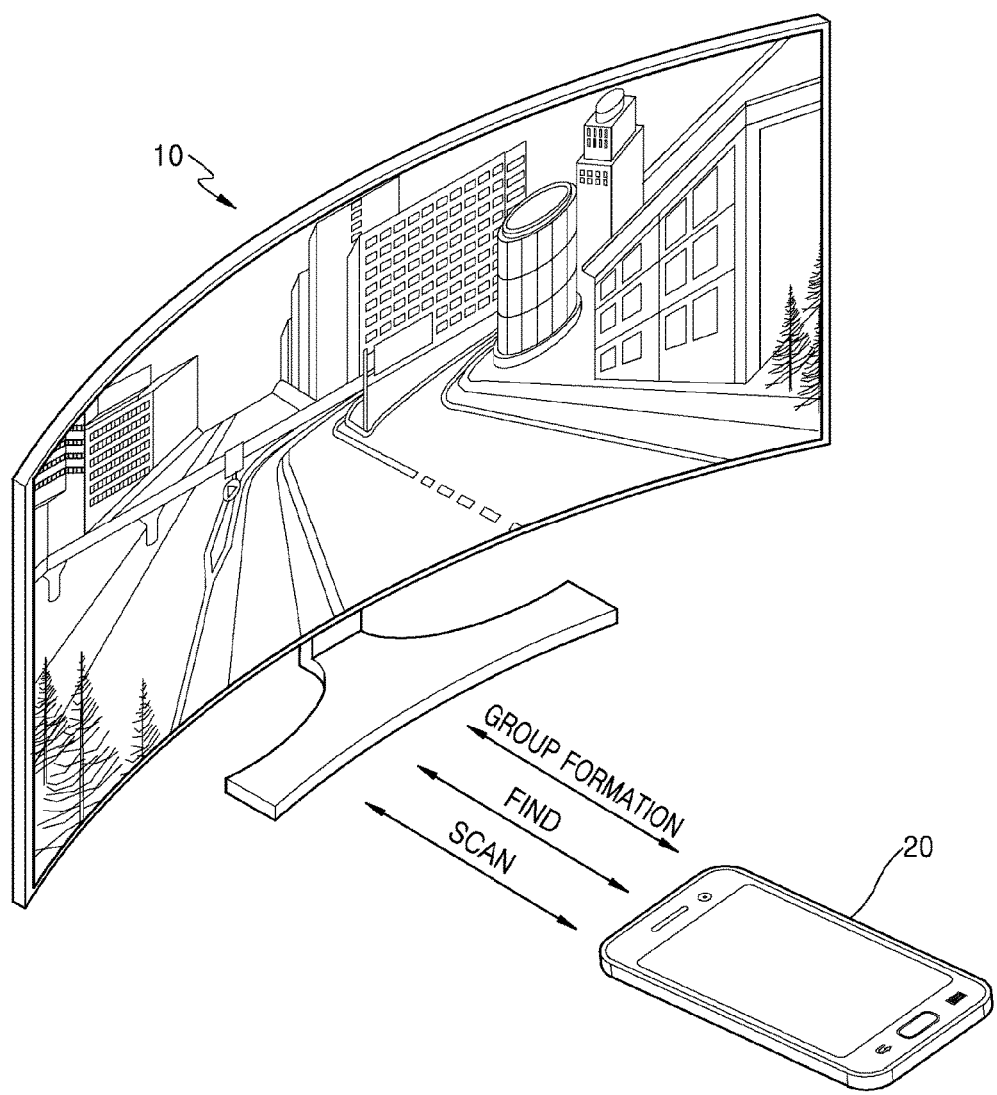
FIG. 1 is a reference view illustrating a peer-to-peer (P2P) communication.

Hereinafter, various exemplary embodiments will be described in detail with reference to the accompanying drawings. While the exemplary embodiments may be embodied in many different forms, particular exemplary embodiments are shown in the drawings and are described herein in detail with the understanding that the exemplary embodiments are to be considered as exemplifications and are not intended to limit the disclosure to the particular exemplary embodiments illustrated. It is therefore intended that the disclosure be interpreted to include all variations and/or equivalents that fall within the spirit and scope of the present disclosure. The same reference numbers are used throughout the drawings to refer to the same or like elements. Expressions such as "at least one of," when preceding a list of elements, modify the entire list of elements and do not modify the individual elements of the list. Also, well-known functions or constructions are not described in detail since they would obscure the exemplary embodiments with unnecessary detail.

The expressions "include," "may include," etc. used in various exemplary embodiments indicate the presence of a disclosed function, operation, or element and do not limit at least one additional function, operation, or element. Further, in various exemplary embodiments, the terms "include," "have," etc. indicate the presence of a characteristic, integer, step, operation, element, part, or combination thereof described in the specification and do not exclude the presence or addition of at least one other characteristic, integer, step, operation, element, part, or combination thereof.

In various exemplary embodiments, the expression "or," etc. includes any combination or all combinations of words listed together. For example, "A or B" may include A, B, or both A and B.

The expressions "first," "second," "primary," "secondary," etc. used in various exemplary embodiments may represent various elements of the various exemplary embodiments, but do not limit the corresponding elements. For example, the expressions do not limit order and/or importance of the corresponding elements. The expressions may be used for distinguishing one element from another element. For example, both a first user device and a second user device are user devices and represent different user devices. For example, a first element may be referred to as a second element without deviating from the scope of various exemplary embodiments, and similarly, a second element may be referred to as a first element.

When an element is described as "coupled" or "connected" to another element, the element may be directly coupled or connected to the other element, or may be coupled or connected to the other element through still another element. However, when an element is described as "directly coupled" or "directly connected" to another element, no element may exist between the element and the other element.

Terms used in various exemplary embodiments are not limiting to the various exemplary embodiments but illustrate particular exemplary embodiments. A singular expression includes a plural expression unless clearly indicated otherwise in context.

Unless defined otherwise, all terms including technical terms and scientific terms used herein have the same meaning as a meaning that may be generally understood by those of ordinary skill in the art to which various exemplary embodiments pertain. It is to be understood that terms defined in generally used dictionaries have meanings corresponding to that of the context of the related technology, and are not to be interpreted as an ideal or excessively formal meaning unless clearly defined in various exemplary embodiments.

Hereinafter, a device according to various exemplary embodiments will be described with reference to the accompanying drawings.

FIG. 1 is a reference view illustrating a peer-to-peer (P2P) communication.

Referring to FIG. 1, a TV 10 and a portable terminal 20 are shown as examples of P2P communication devices.

When a user intends to access the TV 10 using the portable terminal 20, the portable terminal 20 and the TV 10 may detect each other, form a group, and determine a group owner (GO), thereby communicating with each other. The portable terminal 20 and the TV 10 may attain a state in which it is possible to communicate with each other through a scan operation of detecting each other, a find operation of exchanging their device information with each other, and an operation of group formation. When the group including the portable terminal 20 and the TV 10 is formed, a GO which functions as an access point (AP) in the group may be determined. To this end, the portable terminal 20 and the TV 10 perform GO negotiation.

In detail, in GO negotiation, the portable terminal 20 transmits a GO intent value, which is a value indicating the degree of intention of the portable terminal 20 to be the GO, to the TV 10, and the TV 10 transmits a GO intent value, which is a value indicating the degree of intention of the TV 10 to be the GO, to the portable terminal 20. After GO intent values are checked, the GO is determined according to a predetermined reference. For example, the portable terminal 20 may transmit a GO intent value of 2 to the TV 10, and the TV 10 may transmit a GO intent value of 15 to the portable terminal 20. In this example, when a device having a higher intent value is determined as the GO, the TV 10 transmitting a higher intent value may be determined as the GO. In the GO negotiation process, two P2P devices may determine a GO by exchanging GO intent values with each other.

A GO intent value may be determined according to a device or an application.

For example, a plurality of portable terminals may access a single TV 10, and because communication between the single TV 10 and the plurality of portable terminals may be expected, the TV 10 may have a right to control communication with the plurality of portable terminals. Therefore, in the relationship between the TV 10 and the portable terminal 20, the TV 10 may be determined as the GO when the TV 10 has a GO intent value higher than that of the portable terminal 20.

Figure 2:
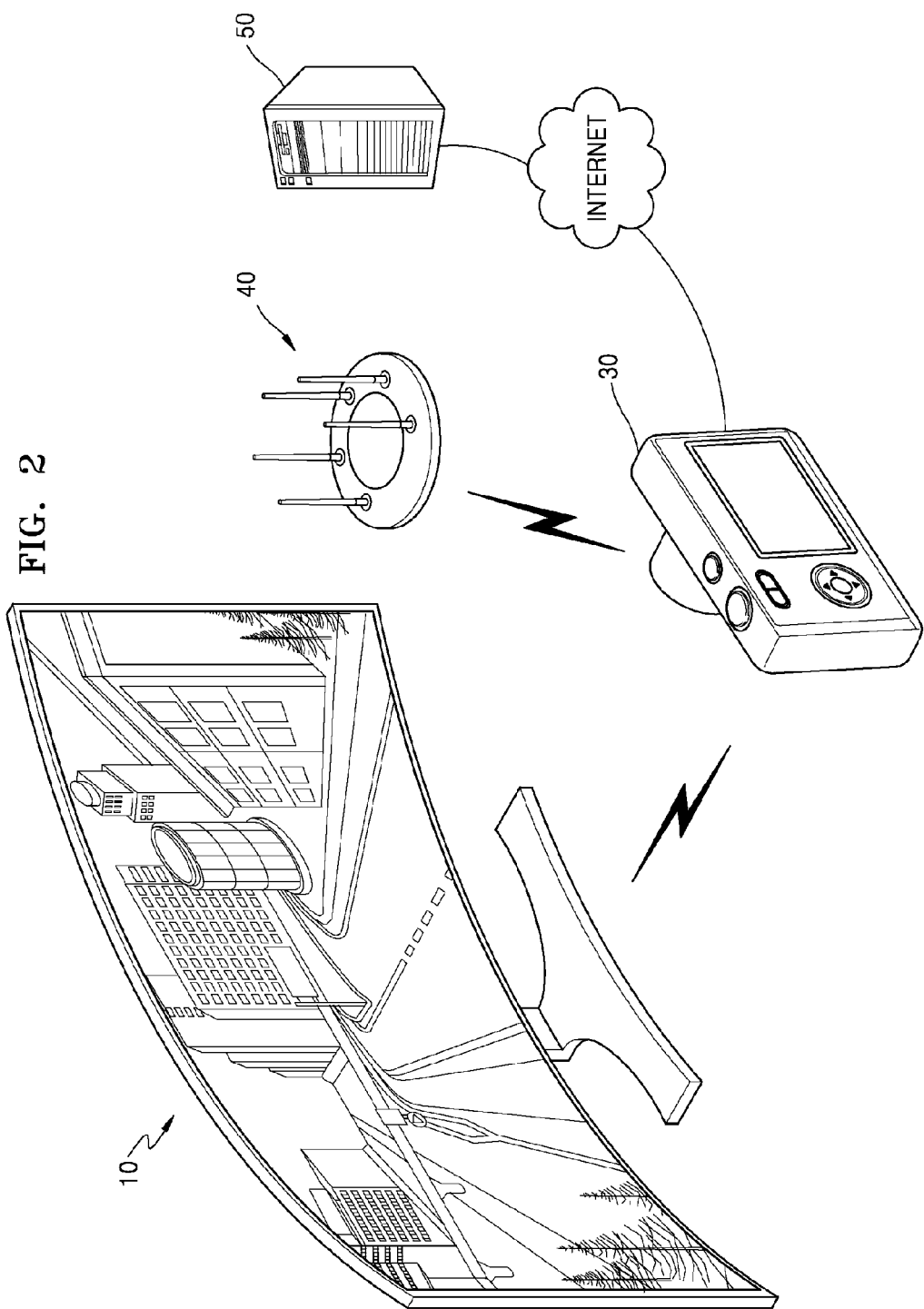
FIG. 2 is a reference view illustrating a P2P communication.

FIG. 2 is a reference view illustrating a P2P communication.

Referring to FIG. 2, a TV 10 and a camera 30 are shown as examples of P2P devices.

For example, a highest GO intent value of 15 may usually be set for the TV 10 except for some cases. The camera 30 and the TV 10 may perform a P2P communication. For example, the camera 30 may access the TV 10 and output an image stored in the camera 30 to the TV 10 so that the image may be displayed on the TV 10. At the same time, the camera 30 may transmit data stored therein to an AP 40, or access a server 50, etc. through the Internet to perform another function. Since the camera 30 may connect to a device and transmit and/or receive data while outputting a stored image to the TV 10, the camera 30 may serve as a GO in communication between the TV 10 and the camera 30. In this case, the highest GO intent value of 15 may also be set for the camera 30.

In this way, in some applications, the highest GO intent value may be set for both of two P2P devices. In this case, when the two P2P devices try to form a group, their GO intent values are identical, and thus a GO may not be determined, or the GO may be determined differently from an intention of an application to be executed between the two P2P devices. If no connection is established between the two P2P devices or a GO is determined differently from an intention of an application, the two P2P devices may not operate according to the intention of the application to be executed between the two P2P devices even when a connection is established between the two P2P devices.

Therefore, according to an exemplary embodiment, when a connection is established between two P2P devices, one of the devices performing P2P communication transmits control information for determining a GO device according to its own intention to the other device so that a GO may be determined according to an intention of the device or an application.

For example, in FIG. 2, the camera 30 may transmit control information containing an intention of the camera 30 to be a GO to the TV 10. The camera 30 may set its own GO intent value to a high value and set a GO intent value of the TV 10 which is originally determined by the TV 10 to a low value as control information, and transmit the control information to the TV 10 to show an intention that the camera 30 become the GO. The TV 10, in response to receiving the control information, may set its own GO intent value to the GO intent value set by the camera 30 and reply to the camera 30, thereby agreeing with the intention that the camera 30 become the GO.

As described above, according to an exemplary embodiment, a GO is not determined by obscurely exchanging GO intent values of devices performing P2P communication with each other, but by making one of the devices performing P2P communication determine which one of the devices will be the GO, the GO may be stably determined.

Figure 3:
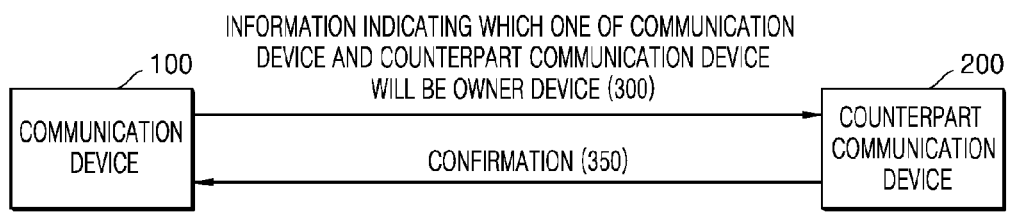
FIG. 3 is a schematic diagram of a system including communication devices according to an exemplary embodiment.

FIG. 3 is a schematic diagram of a system including communication devices according to an exemplary embodiment.

Referring to FIG. 3, the system may include a communication device 100 and a counterpart communication device 200. The communication device 100 and the counterpart communication device 200 may be devices having the same communication function. However, to distinguish between the two communication devices, one of the two communication devices will be referred to as a communication device, and the other will be referred to as a counterpart communication device.

The communication device 100 and the counterpart communication device 200 may be any device which includes communication modules to perform a communication function. For example, the communication device 100 and the counterpart communication device 200 may be a display device, a portable device, a multimedia device, and so on. The display device may be implemented as an analog TV, a digital TV, a three-dimensional (3D) TV, a smart TV, a light-emitting diode (LED) TV, an organic LED (OLED) TV, a plasma TV, a monitor with a set-top box, etc., but is not limited thereto.

The portable device may include at least one of a smart phone, a tablet personal computer (PC), a mobile phone, a video phone, an e-book reader, a laptop PC, a netbook computer, a personal digital assistant (PDA), a portable multimedia player (PMP), an MP3 player, a wearable device, and a smart watch.

The multimedia device may include various devices, such as an audio device, a camera, and so on.

According to an exemplary embodiment, the communication device 100 may determine a device to be an owner device between the communication device 100 and the counterpart communication device 200, and transmit information 300 indicating which one of the communication device 100 and the counterpart communication device 200 is the owner device to the counterpart communication device 200.

According to an exemplary embodiment, the counterpart communication device 200 may receive the information 300 indicating which one of the communication device 100 and the counterpart communication device 200 is the owner device from the communication device 100, and transmit a signal 350 for agreeing with the intention of the communication device 100 to the communication device 100 in response to receiving the information 300.

In this way, one of two communication devices (i.e., the communication device 100 and the counterpart communication device 200) trying to perform communication determines which one is an owner device and transmits information containing an intention indicating which one is the owner device according to the determination to the counterpart communication device, and thus it is possible to stably determine which one of the two communication devices will function as the owner device according to the intention.

In FIG. 3, the communication device 100 determines which one of the communication device 100 and the counterpart communication device 200 is the owner device and transmits information according to the determination to the counterpart communication device 200, but the counterpart communication device 200 may determine and transmit the information according to the determination to the communication device 100.

When determining which one of the communication device 100 and the counterpart communication device 200 is the owner device, the communication device 100 may determine that the communication device 100 functions as the owner device or that the counterpart communication device 200 functions as the owner device.

Figure 4A:
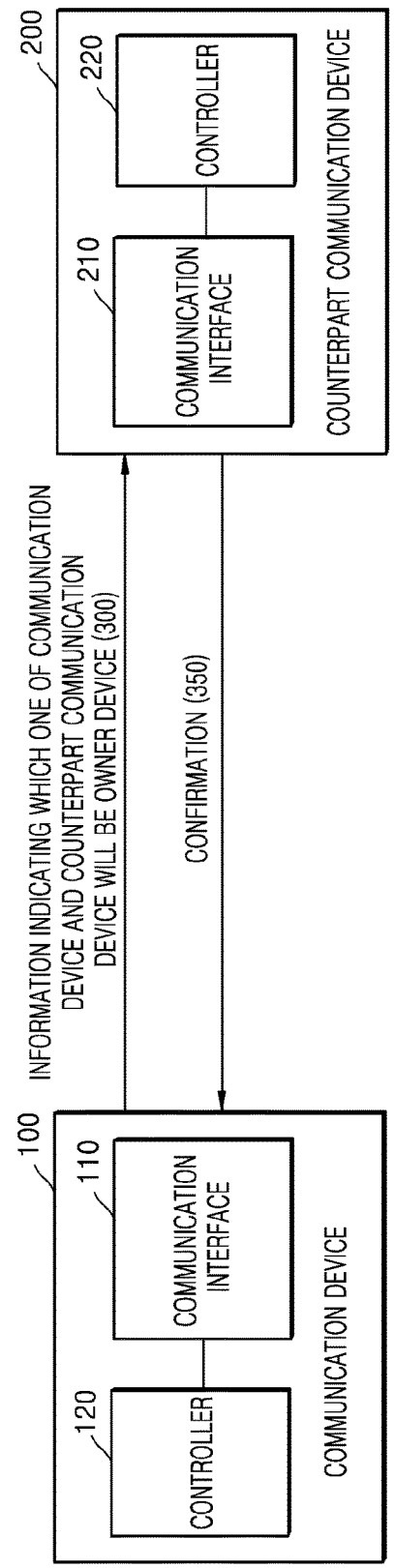
FIG. 4A is a diagram showing detailed configurations of a communication device and a counterpart communication device shown in FIG. 3.

FIG. 4A is a diagram showing detailed configurations of the communication device 100 and the counterpart communication device 200 shown in FIG. 3.

Referring to FIG. 4A, the communication device 100 may include a communication interface 110 and a controller 120.

The communication interface 110 performs communication between the communication device 100 and the counterpart communication device 200 using Wi-Fi communication technology. The communication interface 110 may perform broadband network communication according to various communication standards, such as Zigbee, $3^{rd}$ generation (3G), 3rd generation partnership project (3GPP), Long Term Evolution (LTE), etc., in addition to Wi-Fi communication standards, and perform communication with a nearby device using a short-range communication protocol, such as Bluetooth, near field communication (NFC), infrared communication, laser beam communication, and so on.

Under control of the controller 120, the communication interface 110 may generate various frames for Wi-Fi communication and transmit the frames to the counterpart communication device 200.

According to an exemplary embodiment, the communication interface 110 may transmit information indicating which one of the communication device 100 and the counterpart communication device 200 is an owner device using a GO negotiation request frame or a provision discovery request frame.

The controller 120 controls elements throughout the communication device 100 including the communication interface 110. The controller 120 may include a RAM which stores a signal or data input from the outside of the communication device 100 or is used as a storage area corresponding to various tasks performed by a portable device, a ROM in which a control program for control of nearby devices is stored, and a processor. The processor may be implemented as a system on chip (SoC) in which a core (not shown) and a graphics processing unit (GPU) are integrated. The processor may include a plurality of processors.

According to an exemplary embodiment, the controller 120 may determine which one of the communication device 100 and the counterpart communication device 200 is the owner device in a P2P group, and control the communication interface 110 to generate and transmit a frame including information indicating which one of the communication device 100 and the counterpart communication device 200 is the owner device according to the determination.

The counterpart communication device 200 may include a communication interface 210 and a controller 220.

The communication interface 210 performs communication between the communication device 100 and the counterpart communication device 200 using Wi-Fi communication technology. The communication interface 210 may perform broadband network communication according to various communication standards, such as Zigbee, 3G, 3GPP, LTE, etc., in addition to Wi-Fi communication standards, and perform communication with a nearby device using a short-range communication protocol, such as Bluetooth, NFC, infrared communication, laser beam communication, and so on.

Under control of the controller 220, the communication interface 210 may generate at least one frame for Wi-Fi communication and transmit the frame to the communication device 100, and receive at least one frame from the communication device 100.

According to an exemplary embodiment, the communication interface 210 may receive the GO negotiation request frame or the provision discovery request frame including the information indicating which one of the communication device 100 and the counterpart communication device 200 is the owner device.

According to an exemplary embodiment, in response to receiving the GO negotiation request frame or the provision discovery request frame including the information indicating which one of the communication device 100 and the counterpart communication device 200 is the owner device, the communication interface 210 may generate a GO negotiation response frame including a signal indicating a confirmation of the information and transmit the GO negotiation response frame to the communication device 100.

The controller 220 controls elements throughout the counterpart communication device 200 including the communication interface 210. The controller 220 may include a RAM which stores a signal or data input from the outside of the counterpart communication device 200 or is used as a storage area corresponding to various tasks performed by a portable device, a ROM in which a control program for control of nearby devices is stored, and a processor. The processor may be implemented as a SoC in which a core (not shown) and a GPU are integrated. The processor may include a plurality of processors.

According to an exemplary embodiment, when a frame including information indicating which one of the communication device 100 and the counterpart communication device 200 is the owner device is received from the communication device 100, the controller 220 may examine the information included in the received frame and control the communication interface 210 to generate a response frame based on the information.

Figure 4B:
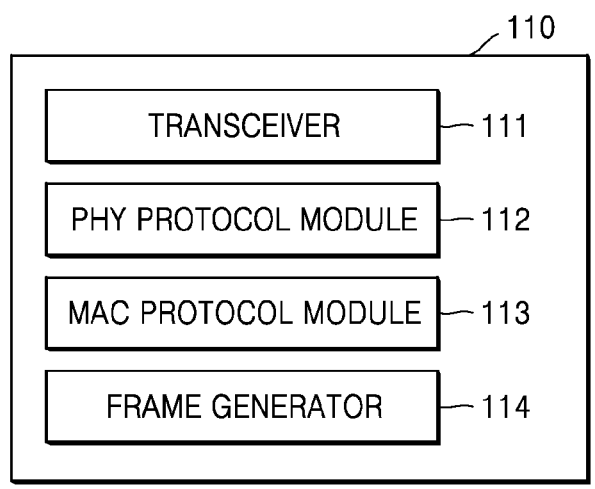
FIG. 4B is a diagram showing a detailed configuration of a communication interface of the communication device shown in FIG. 4A.

FIG. 4B shows a detailed configuration of the communication interface 110 of the communication device 100 shown in FIG. 4A. This is the same for the communication interface 210 of the counterpart communication device 200.

Referring to FIG. 4B, the communication interface 110 may include a transceiver 111, a physical (PHY) protocol module 112, a media access control (MAC) protocol module 113, and a frame generator 114.

The transceiver 111 exchanges data with another communication device using a Wi-Fi network. When information generated by the PHY protocol module 112 is received, the transceiver 111 converts the received information into a radio frequency (RF) spectrum, performs filtering, amplification, etc., and transmits a processed RF signal to an antenna. The transceiver 111 functions to shift an RF signal received from the antenna to a band processable by the PHY protocol module 102 and perform filtering. The transceiver 111 may include a switch function for switching between the transmission function and the reception function.

When data transmission is requested by the MAC protocol module 113, the PHY protocol module 112 performs processing, such as forward error correction (FEC) encoding, modulation, and insertion of an additional signal including a preamble signal, a pilot signal, etc., on the requested data and transfers the processed data to the transceiver 111. Also, when a signal received by the transceiver 111 is received, the PHY protocol module 112 performs processing, such as demodulation, equalization, an FEC decoding, enhancement of a signal added in the PHY layer, etc., on the received signal and transfers the processed data to the MAC protocol module 113. The PHY protocol module 112 may include a modulator, a demodulator, an equalizer, an FEC encoder, and an FEC decoder.

The MAC protocol module 113 performs a process necessary to transfer and transmit data received from an upper layer to the PHY protocol module 112, and takes charge of additional transmissions for basic communication. For example, the MAC protocol module 113 processes data required to be transmitted by the upper layer to be appropriate for transmission, transfers and transmits the processed data to the PHY protocol module 112, processes received data transferred from the PHY protocol module 112, and transfers the processed data to the upper layer. The MAC protocol module 113 may take charge of additional transmissions and receptions necessary for this data transfer, thereby serving to process communication protocols.

The frame generator 114 generates a data frame, a request frame, or a response frame to communicate with another communication device.

According to an exemplary embodiment, the frame generator 114 may generate a GO negotiation request frame including information indicating which one of the communication device 100 and the counterpart communication device 200 is an owner device.

According to an exemplary embodiment, the frame generator 114 may generate a provision discovery request frame including information indicating which one of the communication device 100 and the counterpart communication device 200 will be the owner device.

According to an exemplary embodiment, in response to receiving a frame including information indicating which one of the communication device 100 and the counterpart communication device 200 is the owner device, the frame generator 114 may generate a GO negotiation response frame including a signal indicating a confirmation of the information.

FIG. 5 is a sequence diagram of a communication process between the communication device 100 and the counterpart communication device 200 according to an exemplary embodiment.

Referring to FIG. 5, in operation 510, the communication device 100 determines which one of the communication device 100 and the counterpart communication device 200 is an owner device.

When trying to communicate with the counterpart communication device 200, the communication device 100 may determine whether the communication device 100 or the counterpart communication device 200 is the owner device. For example, when it is determined that the communication device 100 is required to take initiative in accessing communication with the counterpart communication device 200, the communication device 100 may determine itself as the owner device. For example, when a camera device tries to communicate with a display device, the camera device may determine itself as the owner device in a group consisting of the camera device and the display device. Also, for example, the communication device 100 may determine whether it is the owner device according to an application to execute.

In operation 520, the communication device 100 transmits information 300 indicating which one of the communication device 100 and the counterpart communication device 200 is the owner device according to the determination of operation 510 to the counterpart communication device 200.

According to an embodiment, the information 300 indicating which one of the communication device 100 and the counterpart communication device 200 will be the owner device may be transmitted using a P2P frame in accordance with Wi-Fi communication technology.

According to an exemplary embodiment, the information 300 indicating which one of the communication device 100 and the counterpart communication device 200 is the owner device may be transmitted using a GO negotiation request frame in accordance with Wi-Fi communication technology.

According to an exemplary embodiment, the information 300 indicating which one of the communication device 100 and the counterpart communication device 200 is the owner device may be transmitted using a provision discovery request frame in accordance with Wi-Fi communication technology.

In operation 530, the counterpart communication device 200 receives the information 300 indicating which one of the communication device 100 and the counterpart communication device 200 is the owner device from the communication device 100.

In operation 540, the counterpart communication device 200 transmits a signal 550 for confirming the intention of the communication device 100 regarding which one of the communication device 100 and the counterpart communication device 200 is the owner device according to the information 300 received in operation 530.

According to an exemplary embodiment, the counterpart communication device 200 may transmit the signal 550 for confirming the intention of the communication device 100 using a GO negotiation response frame according to Wi-Fi communication technology.

Figure 6:
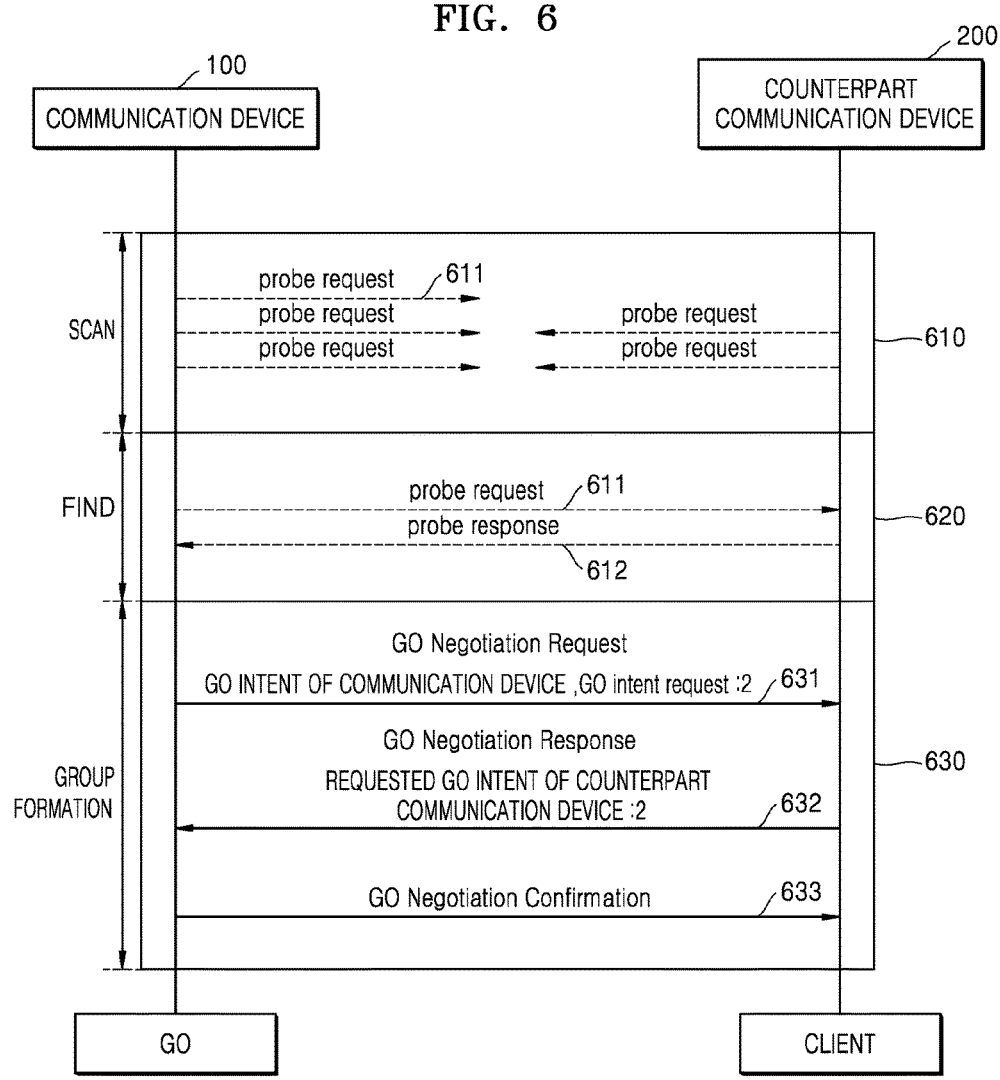
FIG. 6 is a signal sequence diagram showing a communication process for determining an owner device between a communication device and a counterpart communication device according to an exemplary embodiment.

FIG. 6 is a signal sequence diagram showing a communication process for determining an owner device between the communication device 100 and the counterpart communication device 200 according to an exemplary embodiment.

The P2P topology has a 1:n structure in which a plurality of clients may be connected to one GO. Devices connected in this way are referred to a P2P group, and the P2P group denotes a set of devices consisting of a P2P GO and clients. The P2P GO denotes an entity, such as an AP, which may provide and use connectivity between clients.

P2P discovery enables a device to detect a nearby device and a service and establish a connection, and may include four components as follows:

Device discovery: enabling two P2P devices to reach a common channel and exchange their device information;

Service discovery: helping a P2P device to find an available upper layer service before establishing a connection;

Group formation: determining which device will be a GO and whether to form a new P2P group; and P2P invitation: inviting a P2P device to an existing P2P group.

The signal sequence of FIG. 6 relates to a device discovery operation and a group formation operation among P2P discovery components.

Device discovery enables two P2P devices to reach a common channel and exchange their device information, such as device names and device types. A P2P device may use a scan operation to detect P2P devices or P2P groups using a probe request frame and a probe response frame. Two P2P devices, which are simultaneously carrying out a search, may reach a common channel and communicate with each other through a find operation. In order to perform the device discovery operation, a P2P device should switch between a state (i.e., a listen state) of waiting in a fixed channel for a probe request frame and a state (i.e., a search state) of sending a probe request frame to channels of a fixed list.

The P2P device (i.e., P2P device 1) in the scan operation may detect the P2P device (i.e., P2P device 2) in the listen state. The two P2P devices may reach a common channel in the device discovery operation and exchange their device information through the find operation. Next, if a P2P device wants to connect to another P2P device, it is possible to start a GO negotiation to form a new P2P group.

Referring to FIG. 6, in a scan operation 610, the communication device 100 and the counterpart communication device 200 transmit probe request frames 611 to each other.

Then, in a find operation 620, the counterpart communication device 200 transmits a probe response frame 612 to the communication device 100 in response to a probe request frame 611 transmitted from the communication device 100 so that the communication device 100 and the counterpart communication device 200 detect each other.

A group formation operation 630 is used to determine which device is a P2P GO and whether to form a new P2P group.

In order to perform the group formation operation, P2P devices may perform GO negotiation.

The GO negotiation is an exchange of frames used to confirm information indicating which one of the P2P devices is a P2P GO. The primary goal of the GO negotiation is to exchange GO intent attributes to communicate intent to become the P2P GO. If one P2P device wants to be the P2P GO, the P2P device sets its intent value to 15. A GO intent attribute contains an intent value of a P2P device which wants to be the P2P GO. A GO intent value is information used to determine which P2P device is the P2P GO.

Referring to FIG. 6, in the group formation operation 630, the communication device 100 may start the GO negotiation by transmitting a GO negotiation request frame 631 to the counterpart communication device 200. At this time, the communication device 100 may transmit information indicating which one of the communication device 100 and the counterpart communication device 200 is the owner device using the GO negotiation request frame 631.

According to an exemplary embodiment, the communication device 100 may transmit the GO negotiation request frame 631 including its own GO intent value and a GO intent value of the counterpart communication device 200 that is wanted by the communication device 100 as information indicating which one of the communication device 100 and the counterpart communication device 200 is the owner device. In FIG. 6, the communication device 100 determines that the communication device 100 is the GO device, and sets its own GO intent value and GO intent value of the counterpart communication device 200 to 15 and 2, respectively, in the GO negotiation request frame 631.

The counterpart communication device 200 may examine, in response to receiving the GO negotiation request frame 631, information included in the GO negotiation request frame 631, that is, the information indicating which one of the communication device 100 and the counterpart communication device 200 is the owner device, and transmit a signal for agreeing to the information to the communication device 100.

At this time, the counterpart communication device 200 may transmit a GO negotiation response frame 632 as the signal for confirming the request of the communication device 100. The counterpart communication device 200 may transmit the GO negotiation response frame 632 including the GO intent value transmitted by the communication device 100, and agree to the request that the communication device 100 be the GO device by transmitting the GO negotiation response frame 632. Also, the counterpart communication device 200 may transmit information indicating a success state as well as the requested GO intent value in the GO negotiation response frame 632, thereby indicating its own intent to continue group formation.

When the GO negotiation response frame 632 including a state code "Success" is received from the counterpart communication device 200, the communication device 100 may examine the received information and transmit a GO negotiation confirmation frame.

Figure 7:
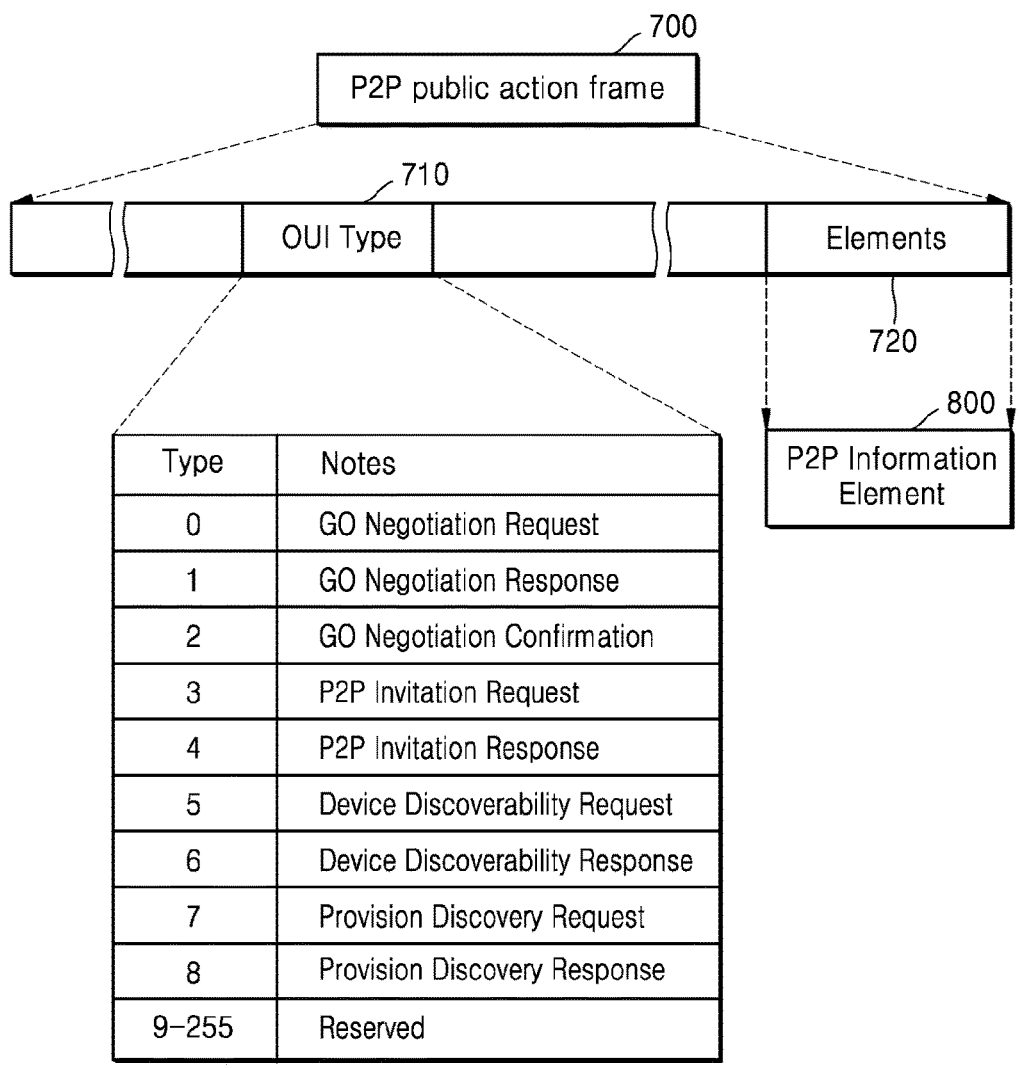
FIG. 7 shows a frame which may be used in the signal sequence shown in FIG. 6 according to an exemplary embodiment.

FIG. 7 shows a frame which may be used in the signal sequence shown in FIG. 6 according to an exemplary embodiment.

A P2P public action frame format is used to define a GO negotiation request frame, a GO negotiation response frame, a provision discovery request frame, or a provision discovery response frame.

Referring to FIG. 7, a P2P public action frame 700 may include an organizationally unique identifier (OUI) type field 710 and an element field 720.

The OUI type field 710 may indicate a type of the P2P public action frame 700. As shown in FIG. 7, a GO negotiation request frame may be represented as type 0, a GO negotiation response frame may be represented as type 1, and a GO negotiation confirmation frame may be represented as type 2. Also, a provision discovery request frame may be represented as type 7, and a provision discovery response frame may be represented as type 8.

The element field 720 may include a P2P information element 800.

Figure 8:
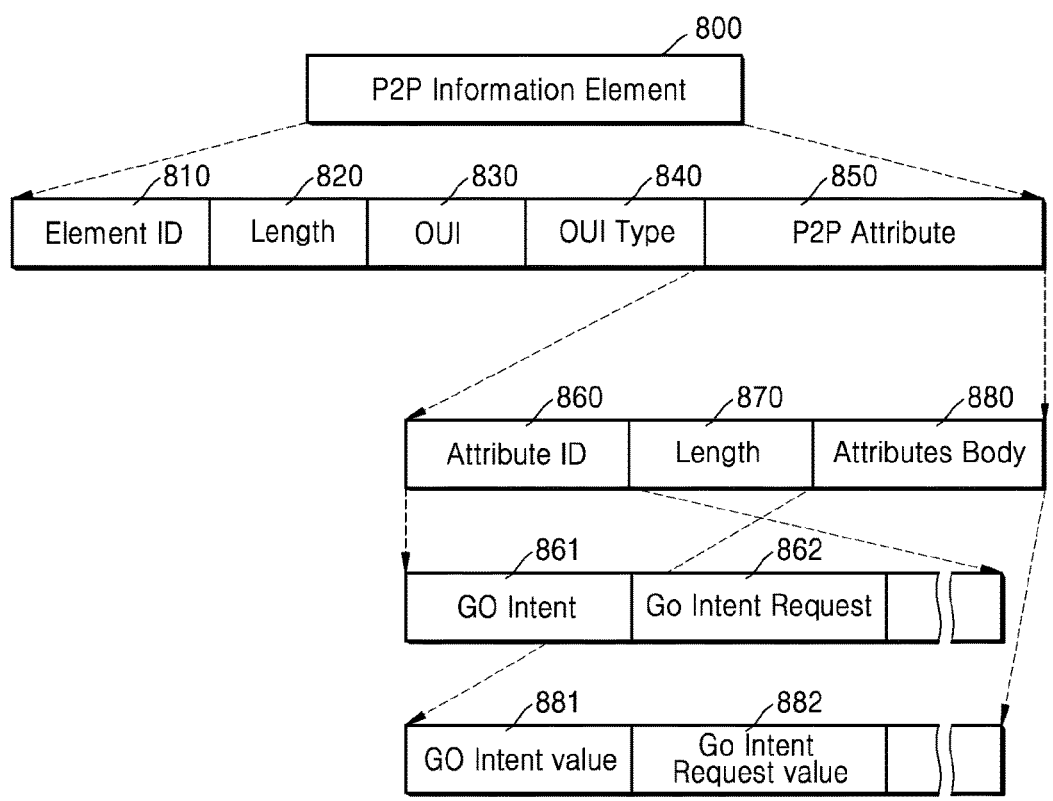
FIG. 8 shows a detailed structure of a P2P information element shown in FIG. 7 according to an exemplary embodiment.

FIG. 8 shows a detailed structure of the P2P information element 800 shown in FIG. 7 according to an exemplary embodiment.

Referring to FIG. 8, the P2P information element 800 may include an element identifier (ID) 810, a length 820, an OUI 830, an OUI type 840, and a P2P attribute 850.

The element ID 810 indicates a company-specific particular value according to Wi-Fi direct specifications.

The length 820 indicates a length from the OUI 830 to the P2P attribute 850.

The OUI 830 is a value which varies according to company and is set by each company.

The OUI type 840 indicates the type or version of the P2P information element 800.

The P2P attribute 850 includes one or more attributes contained in the P2P information element 800.

The P2P attribute 850 may include an attribute ID 860, a length 870, and an attribute body 880.

The attribute ID 860 indicates the type of the P2P attribute 850. The length 870 indicates a length of an attribute body field. The attribute body 880 indicates a detailed value of the P2P attribute 850.

According to an exemplary embodiment, the attribute ID 860 may include a GO intent 861 and a GO intent request 862. The GO intent 861 indicates an intent attribute representing the degree of an intention of a device transmitting the corresponding frame, for example, the communication device 100, to be a GO, and the GO intent request 862 indicates an intent attribute of the counterpart communication device 200 set by the communication device 100.

According to an exemplary embodiment, the attribute body 880 may include a GO intent value 881 and a GO intent request value 882. The GO intent value 881 is a value which corresponds to the GO intent 861 and is actually set by the communication device 100, and the GO intent request value 882 indicates a value which corresponds to the GO intent request 862 and is actually set by the communication device 100.

Figure 9:
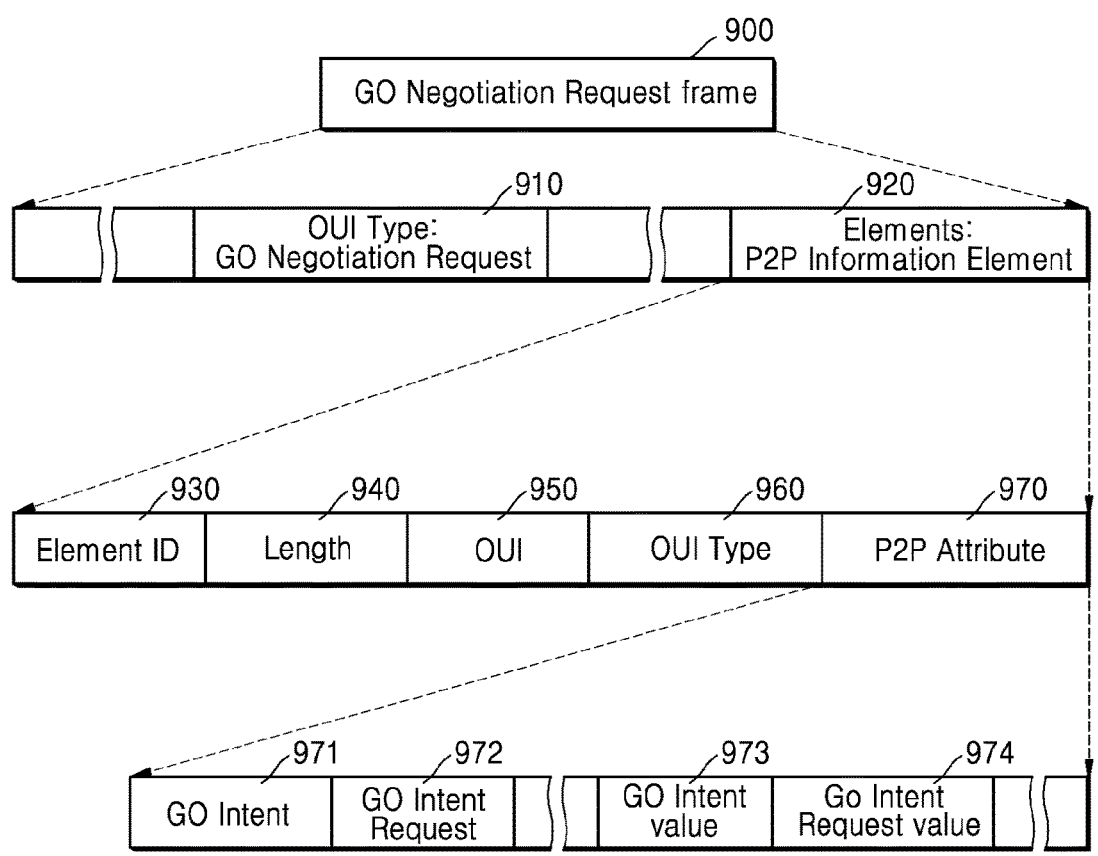
FIG. 9 shows a group owner (GO) negotiation request frame according to an exemplary embodiment.

FIG. 9 shows a GO negotiation request frame 900 according to an exemplary embodiment.

Referring to FIG. 9, the GO negotiation request frame 900 according to an exemplary embodiment may include an OUI type 910 set to GO negotiation request and elements 920 set to P2P information elements.

The P2P information elements may include an element ID 930, a length 940, an OUI 950, an OUI type 960, and a P2P attribute 970.

The P2P attribute 970 may include a GO intent 971 which indicates an intent attribute of a device transmitting the GO negotiation request frame 900, a GO intent request 972, a GO intent value 973, and a GO intent request value 974. Since the GO intent 971, the GO intent request 972, the GO intent value 973, and the GO intent request value 974 are the same as the GO intent 861, the GO intent request 862, the GO intent value 881, and the GO intent request value 882 shown in FIG. 8, descriptions thereof will not be reiterated.

For example, according to which one of the communication device 100 and the counterpart communication device 200 is a GO device, the communication device 100 may determine the GO intent value 881 and the GO intent request value 882. For example, when the communication device 100 intends to be a GO device, the communication device 100 may set the GO intent value 881 to be higher than the GO intent request value 882.

Figure 10:
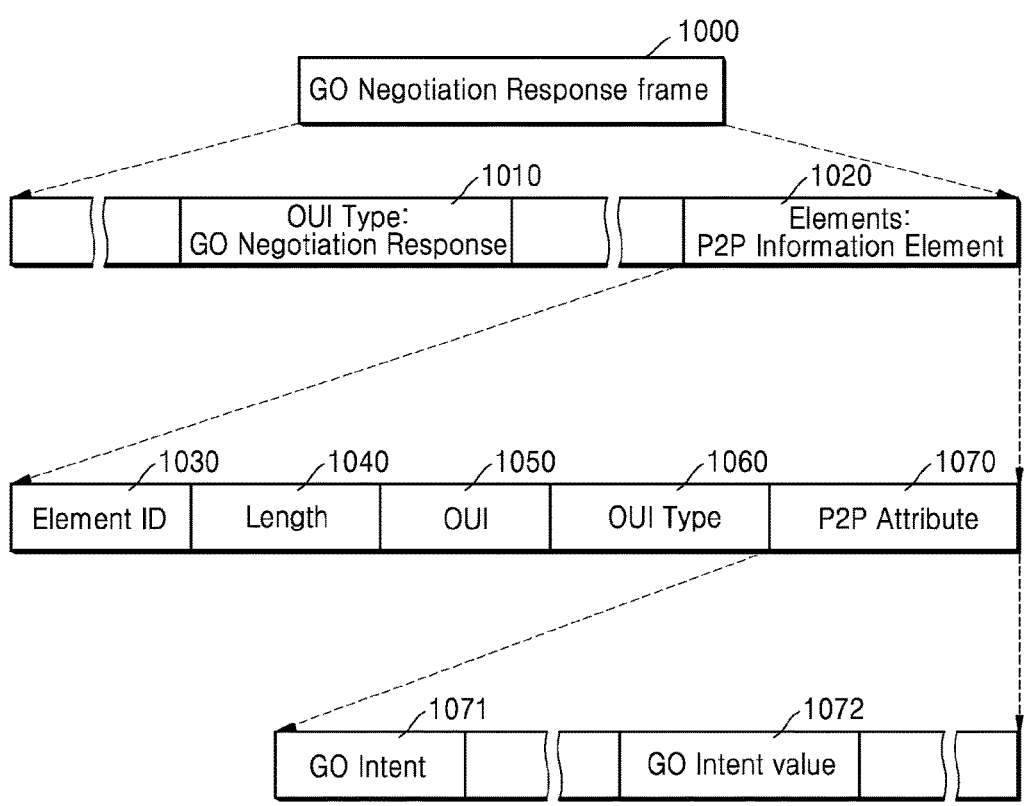
FIG. 10 shows a GO negotiation request frame according to an exemplary embodiment.

FIG. 10 shows a GO negotiation response frame 1000 according to an exemplary embodiment.

Referring to FIG. 10, the GO negotiation response frame 1000 according to an exemplary embodiment may include an OUI type 1010 set to GO negotiation response and elements 1020 set to P2P information elements.

The P2P information elements may include an element ID 1030, a length 1040, an OUI 1050, an OUI type 1060, and a P2P attribute 1070.

The P2P attribute 1070 may include a GO intent 1071 which indicates an intent attribute of a device transmitting the GO negotiation response frame 1000, and a GO intent value 1072.

The counterpart communication device 200 receiving the GO negotiation request frame 900 from the communication device 100 according to an exemplary embodiment may agree with the intention of the communication device 100 by setting the GO intent value 1072 to the GO intent request value 882 included in the GO negotiation request frame 900.

Figure 11:
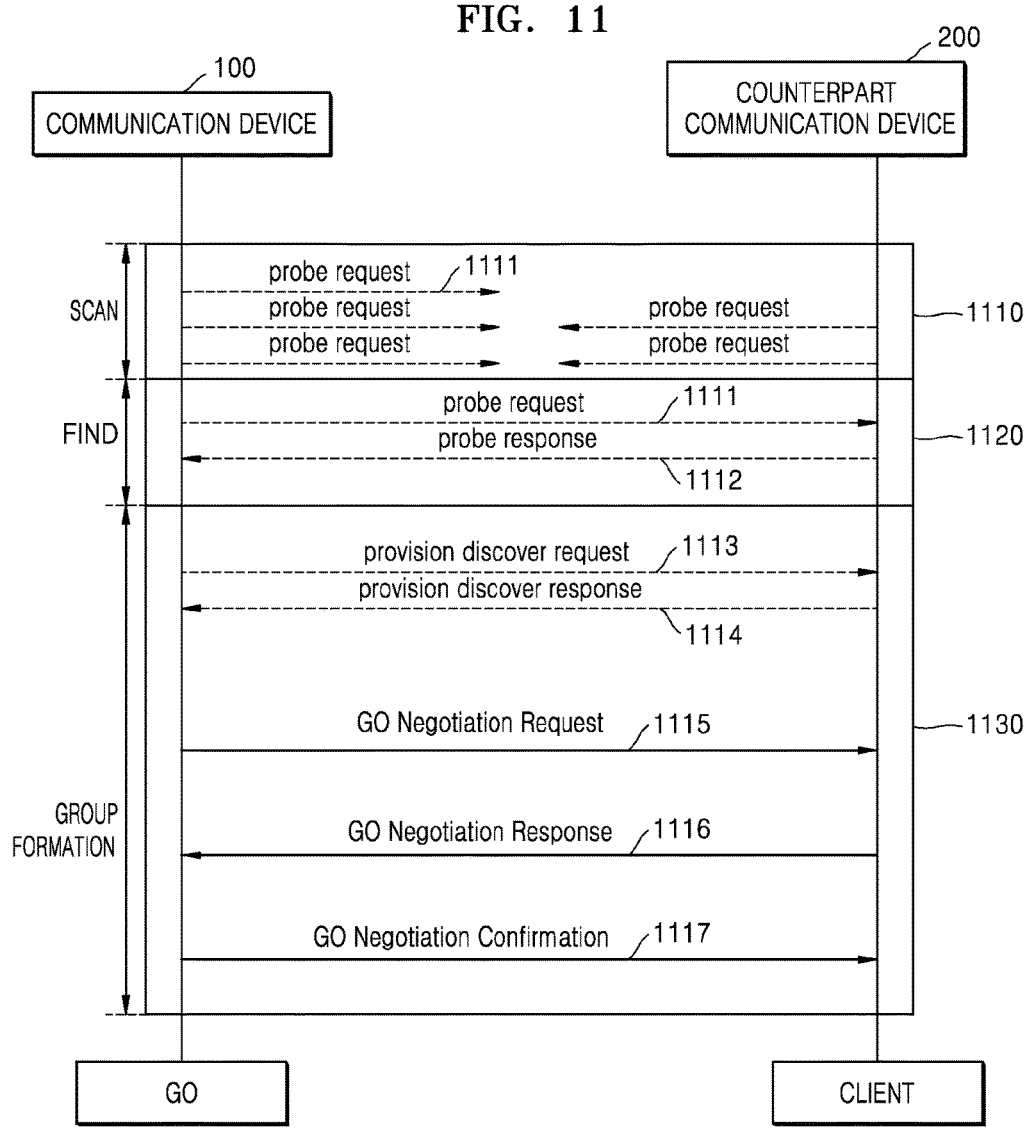
FIG. 11 is a signal sequence diagram showing a communication process for determining an owner device between a communication device and a counterpart communication device according to an exemplary embodiment.

FIG. 11 is a signal sequence diagram showing a communication process for determining an owner device between the communication device 100 and the counterpart communication device 200 according to an exemplary embodiment.

Referring to FIG. 11, in a scan operation 1110, the communication device 100 and the counterpart communication device 200 transmit probe request frames 1111 to each other.

Then, in a find operation 1120, the counterpart communication device 200 transmits, in response to a probe request frame 1111 transmitted from the communication device 100, a probe response frame 1112 to the communication device 100 so that the communication device 100 and the counterpart communication device 200 detect each other.

A group formation operation 1130 is used to determine which device is a P2P GO and whether to form a new P2P group.

In the group formation, P2P devices perform GO negotiation. However, in the exemplary embodiment shown in FIG. 11, the communication device 100 and the counterpart communication device 200 may perform a process of exchanging a provision discovery request frame and a provision discovery response frame before starting GO negotiation, unlike the exemplary embodiment shown in FIG. 6.

The provision discovery request frame is a frame transmitted to trigger a required action by a device receiving the frame.

The provision discovery response frame is a response frame to a provision discovery request frame, and may include a state code "Success" or "Failure."

According to an exemplary embodiment, the communication device 100 may transmit a provision discovery request frame 1113 including a GO intent attribute of the counterpart communication device 200 set by the communication device 100 to the counterpart communication device 200. For example, when the communication device 100 wants to be the GO device, the communication device 100 may set a value of the GO intent attribute of the counterpart communication device 200 to a value (e.g., 2) which is lower than a GO intent value (e.g., 15) of the communication device 100.

The counterpart communication device 200 may examine, in response to receiving the provision discovery request frame 1113 including the GO intent value of the counterpart communication device 200 set by the communication device 100, the intent value included in the provision discovery request frame 1113 and transmit a provision discovery response frame 1114 to the communication device 100 in response to the provision discovery request frame 1113.

Next, the communication device 100 may start GO negotiation by transmitting a GO negotiation request frame 1115 to the counterpart communication device 200. At this time, the communication device 100 may transmit the GO negotiation request frame 1115 including the GO intent value, for example, "15," of the communication device 100.

The counterpart communication device 200 receiving the GO negotiation request frame 1115 may transmit a GO negotiation response frame 1116 including the GO intent value, which is included in the previously received provision discovery request frame 1113 and is GO intent value of the counterpart communication device 200 set by the communication device 100, as its own GO intent value, to the communication device 100. In this way, the counterpart communication device 200 may include the GO intent value of the counterpart communication device 200 set by the communication device 100 in the GO negotiation response frame 1116 as its own GO intent value and transmit the GO negotiation response frame 1116 to the communication device 100, thereby agreeing to the request of the communication device 100, that is, the intention of the communication device 100 regarding which one of the communication device 100 and the communication device 100 is determined as the GO device. If the GO intent value of the counterpart communication device 200 set by the communication device 100 is 2, the counterpart communication device 200 may transmit the GO negotiation response frame 1116 including "2" as the GO intent value of the counterpart communication device 200 and "Success" as a state code to the communication device 100.

Next, the communication device 100 receiving the GO negotiation response frame 1116 may transmit a GO negotiation confirmation frame 1117 to the counterpart communication device 200.

As described above, the communication device 100 transmits the GO intent value of the counterpart communication device 200 set by the communication device 100 through the provision discovery request frame 1113, and the counterpart communication device 200 receiving the provision discovery request frame 1113 includes the GO intent value requested by the communication device 100 through the provision discovery request frame 1113 in the GO negotiation response frame 1116, and transmits the GO negotiation response frame 1116 to the communication device 100 so that the communication device 100 may determine the owner device between the communication device 100 and the counterpart communication device 200 as it wants.

Figure 12:
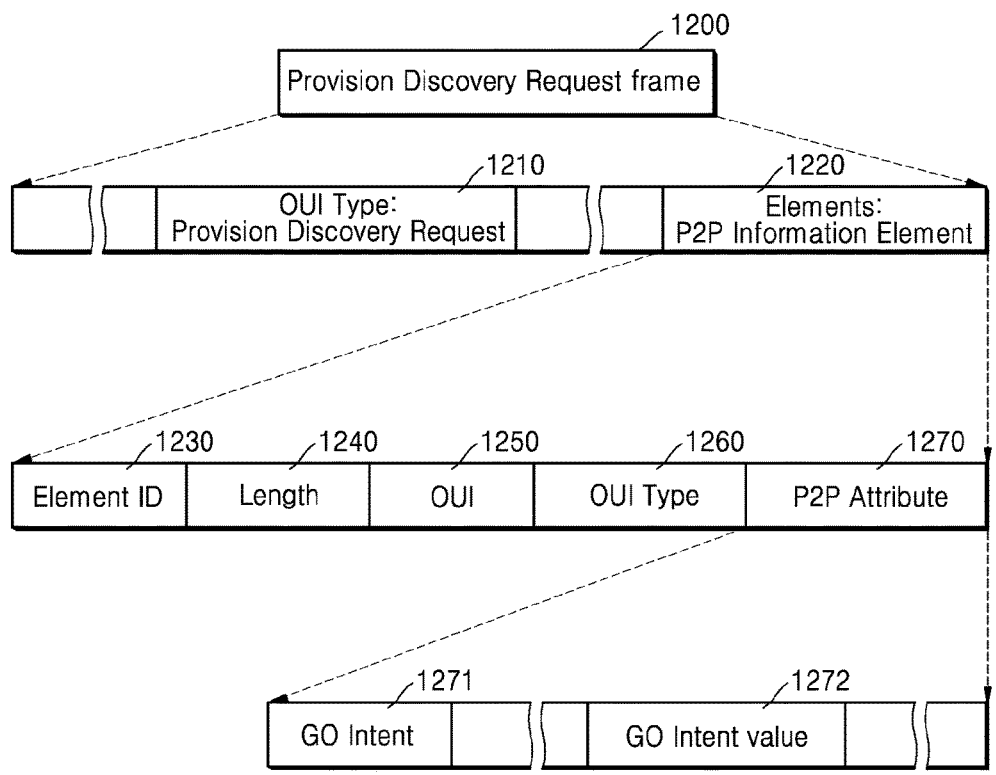
FIG. 12 shows an example of a provision discovery request frame used according to the exemplary embodiment shown in FIG. 11.

FIG. 12 shows an example of a provision discovery request frame 1200 used according to the exemplary embodiment shown in FIG. 11.

Referring to FIG. 12, a provision discovery request frame 1200 according to an exemplary embodiment may include an OUI type 1210 set to provision discovery request and elements 1220 set to P2P information elements.

The P2P information elements may include an element ID 1230, a length 1240, an OUI 1250, an OUI type 1260, and a P2P attribute 1270.

The P2P attribute 1270 may include a GO intent 1271 which indicates an intent attribute of a device transmitting the provision discovery request frame 1200, and a GO intent value 1272.

FIG. 13 is a signal sequence diagram showing a communication process for determining an owner device between the communication device 100 and the counterpart communication device 200 according to an exemplary embodiment. In FIG. 13, a GO device is determined by transmitting a GO intent value and a GO intent request value through a GO negotiation request frame, like in the exemplary embodiment shown in FIG. 6. However, in FIG. 13, even when a response to the GO negotiation request frame fails, it is possible to determine the GO device later using values included in the GO negotiation request frame.

Referring to FIG. 13, in a scan operation 1310, the communication device 100 and the counterpart communication device 200 transmit probe request frames 1311 to each other.

Then, in a find operation 1320, the counterpart communication device 200 transmits, in response to a probe request frame 1311 transmitted from the communication device 100, a probe response frame 1312 to the communication device 100 so that the communication device 100 and the counterpart communication device 200 detect each other.

A group formation operation 1330 is used to determine which device is a P2P GO and whether to form a new P2P group.

In the group formation operation 1330, the communication device 100 may start GO negotiation by transmitting a GO negotiation request frame 1331 to the counterpart communication device 200. At this time, the communication device 100 may transmit information indicating which one of the communication device 100 and the counterpart communication device 200 is the owner device through the GO negotiation request frame 1331.

According to an exemplary embodiment, the communication device 100 may include its own GO intent value and a GO intent value of the counterpart communication device 200 set by the communication device 100 in the GO negotiation request frame 1331 as information indicating which one of the communication device 100 and the counterpart communication device 200 is the owner device. In FIG. 13, for example, the communication device 100 determines itself to be the GO device, and sets its own GO intent value and the GO intent value of the counterpart communication device 200 to 15 and 2, respectively, in the GO negotiation request frame 1331.

The counterpart communication device 200 receives the GO negotiation request frame 1331. However, the counterpart communication device 200 may be under a particular task 1340 in which it is not possible to transmit a GO negotiation response frame including a state code "Success" in response to the GO negotiation request frame 1331. In this case, the counterpart communication device 200 may transmit a GO negotiation response frame 1332 including a state code "Failure" to the communication device 100.

After finishing the particular task 1340, the counterpart communication device 200 may generate a GO negotiation request frame 1333 which reflects the intention of the communication device 100 included in the GO negotiation request frame 1331 received from the communication device 100. For example, the GO negotiation request frame 1331 received from the communication device 100 includes a GO intent value of 2 of the counterpart communication device 200 set by the communication device 100, and thus the counterpart communication device 200 may recognize that the communication device 100 sets the GO intent value of 2 of the counterpart communication device 200.

Therefore, the counterpart communication device 200 may generate the GO negotiation request frame 1333 including the GO intent value of 2 of the counterpart communication device 200 set by the communication device 100, and transmit the GO negotiation request frame 1333 to the communication device 100.

The communication device 100 receiving the GO negotiation request frame 1333 including the GO intent value of 2 of the counterpart communication device 200 may transmit a GO negotiation response frame 1334 including its own GO intent value of 15 to the counterpart communication device 200 in response to the GO negotiation request frame 1333.

In response to the GO negotiation response frame 1334, the counterpart communication device 200 may transmit a GO negotiation confirmation frame 1335 to the communication device 100.

As described above, even when a response to a GO negotiation request frame including a GO intent value of the communication device 100 and a GO intent value of the counterpart communication device 200 set by the communication device 100 initially fails, the counterpart communication device 200 receiving the GO negotiation request frame may transmit a GO negotiation request frame in which a GO intent value of the counterpart communication device 200 is set to reflect the intention of the communication device 100 included in the GO negotiation request frame to the communication device 100, so that a GO device may be determined according to the intention of the communication device 100.

According to the exemplary embodiments, communication devices which perform P2P communication may stably determine a GO device according to an intention of a communication device.

The term "module" used in various exemplary embodiments may refer to, for example, a unit including one of hardware, software, and firmware, or a combination of two or more thereof. The term "module" may be interchangeable with a term, such as a unit, a logic, a logical block, a component, a circuit, and so on. A module may be a smallest unit of an integrated component or a part thereof. A module may be a smallest unit for performing one or more functions or a part thereof. A module may be mechanically or electronically implemented. For example, a module according to various exemplary embodiments may include at least one of an application-specific integrated circuit (ASIC) chip, field-programmable gate arrays (FPGAs), and a programmable-logic device for performing operations which are known or will be developed in the future.

According to various exemplary embodiments, at least some of devices (e.g., modules or functions thereof) or methods (e.g., operations) may be implemented by instructions stored in computer-readable storage media in the form of, for example, programming modules. When the instructions are executed by one or more processors, the one or more processors may perform functions corresponding to the instructions. The computer-readable storage media may be, for example, a memory. At least some of the programming modules may be implemented (e.g., executed) by, for example, the processors. At least some of the programming modules may include, for example, a module, a program, a routine, a set of instructions, a process, etc. for performing one or more functions.

The computer-readable recording media may include magnetic media, such as a hard disk, a floppy disk, and a magnetic tape, optical media, such as a compact disc ROM (CD-ROM) and a digital versatile disc (DVD), magneto-optical media, such as a floptical disk, and hardware devices, such as a ROM, a RAM, a flash memory, etc., specially configured to store and execute a program instruction (e.g., a programming module). Also, the program instruction may include a high-level language code executable by a computer using an interpreter, etc. as well as a machine language code created by a compiler. The aforementioned hardware device may be configured to operate as one or more software modules to perform operations of various exemplary embodiments, and vice versa.

A module or a programming module according to various exemplary embodiments may include at least one of the above-described elements, exclude some of the above-described elements, or further include an additional element. Operations performed by a module, a programming module, or another element according to various exemplary embodiments may be performed sequentially, in parallel, iteratively, or in a heuristic manner. Also, some operations may be executed in an alternative order or omitted, or another operation may be added.

Exemplary embodiments have been described with reference to different functional units and processors. However, it should be apparent that any suitable distribution of functionality between different functional units or processors may be achieved without departing from the disclosure. For example, functions illustrated to be performed by separate processors or controllers may be performed by the same processor or controller, and in some cases, these functions may be interchanged with each other. Consequently, references to particular functional units are to be seen only as references to suitable means for performing the functionality, rather than indicative of a strict logical or physical structure or organization.

Although a few exemplary embodiments have been shown and described, it would be appreciated by those skilled in the art that changes may be made in the exemplary embodiments without departing from the principles and spirit of the disclosure, the scope of which is defined in the claims and their equivalents.

Furthermore, although individually listed, a plurality of means, elements, or operations may be implemented by a single unit or processor. Additionally, although individual features may be included in different claims, these may possibly be combined. The inclusion in different claims does not imply that a combination of features is not feasible or advantageous. Also, the inclusion of a feature in one category of the claims does not imply a limitation to this category, but rather the feature may be equally applicable to other claim categories, as appropriate.

What is claimed is:

1. A communication device comprising: a communication interface; and a controller configured to:
    determine that one of the communication device and a counterpart communication device communicating with the communication device is to function as a group owner (GO) device,
    determine a GO intent value of the counterpart communication device,
    control the communication interface to transmit a GO negotiation request frame including a GO intent value of the communication device and the GO intent value of the counterpart communication device to the counterpart communication device, and control the communication interface to receive a GO negotiation response frame indicating that the counterpart communication device agrees to the GO intent value of the counterpart communication device, from the counterpart communication device,
    wherein the GO intent value indicates a degree of intention to be the GO device.

2. The communication device of claim 1, wherein the communication interface transmits the GO negotiation request frame using at least one of a wireless fidelity (Wi-Fi) GO negotiation request frame and a Wi-Fi provision discovery request frame.

3. A communication method of a communication device comprising:
    determining that one of the communication device and a counterpart communication device communicating with the communication device is to function as a group owner (GO) device; and
    determining a GO intent value of the counterpart communication device,
    transmitting a GO negotiation request frame including a GO intent value of the communication device and the GO intent value of the counterpart communication device to the counterpart communication device, and
    receiving a GO negotiation response frame indicating that the counterpart communication device agrees to the GO intent value of the counterpart communication device, from the counterpart communication device,
    wherein the GO intent value indicates a degree of intention to be the GO device.

4. The communication method of claim 3, wherein the transmitting of the GO negotiation request frame comprises transmitting the GO negotiation request frame using at least one of a wireless fidelity (Wi-Fi) GO negotiation request frame and a Wi-Fi provision discovery request frame.

5. A communication system comprising: a communication device configured to:
    determine that one of the communication device and a counterpart communication device communicating with the communication device is to function as a group owner (GO) device,
    determine a GO intent value of the counterpart communication device, and transmit a GO negotiation request frame including a GO intent value of the communication device and the GO intent value of the counterpart communication device to the counterpart communication device; and the counterpart communication device configured to:
    receive the GO negotiation request frame from the communication device, and transmit a GO negotiation response frame indicating that the counterpart communication device agrees to the GO intent value of the counterpart communication device to the communication device in response to the GO negotiation request frame,
    wherein the GO intent value indicates a degree of intention to be the GO device.

6. The communication system of claim 5, wherein the communication device transmits the GO negotiation request frame using at least one of a wireless fidelity (Wi-Fi) GO negotiation request frame and a Wi-Fi provision discovery request frame.

7. The communication system of claim 5, wherein the GO negotiation response frame includes the GO intent value of the counterpart communication device determined by the communication device.

8. A communication method of a communication device and a counterpart communication device communicating with the communication device, the communication method comprising:
- performing a scan operation, by the communication device and the counterpart communication device, to transmit probe request frames to each other;
- performing a find operation, by the counterpart communication device, in response to a probe request frame transmitted from the communication device, to transmit a probe response frame to the communication device to detect each other; and
- performing a group formation operation to determine a device to function as a group owner (GO) device from the communication device and the counterpart communication device, wherein the performing the group formation operation comprises:
- determining, by the communication device, that one of the communication device and the counterpart communication device communicating with the communication device is to function as the group owner (GO) device,
- determining, by the communication device, a GO intent value of the counterpart communication device,
- transmitting, by the communication device, a GO negotiation request frame including a GO intent value of the communication device and the GO intent value of the counterpart communication device to the counterpart communication device; and
- transmitting, by the counterpart communication device, to the communication device, a GO negotiation response frame indicating that the counterpart communication device agrees to the GO intent value of the counterpart communication device,
- wherein the GO intent value indicates a degree of intention to be the GO device.

9. The communication method of claim 8, wherein the performing the group formation operation further comprises transmitting, by the counterpart communication device, a state code indicating an intent to continue group formation to the communication device.

10. The communication system of claim 5, wherein the GO negotiation response frame includes the GO intent value of the communication device and the GO intent value of the counterpart communication device set by the communication device, and information indicating a success state.

11. The communication method of claim 8, wherein the GO negotiation response frame includes the GO intent value of the communication device and the GO intent value of the counterpart communication device set by the communication device, and information indicating a success state.

12. The communication device of claim 1, wherein the controller is further configured to: determine the GO intent value of the counterpart communication device, based on whether the communication device is determined to function as the group owner (GO) device, wherein the GO intent value of the communication device, which is determined to function as the group owner (GO) device, from among the communication device and the counterpart communication device, is determined to be higher than the GO intent value of the counterpart communication device.

* * * * *